(12) United States Patent
Sankararaman

(10) Patent No.: US 12,743,667 B2
(45) Date of Patent: Sep. 22, 2026

(54) MULTI-ARM BANDIT FOR CONTINUOUS TRAFFIC ALLOCATION IN A/B TESTING HAVING CONTINUOUS REWARDS

(71) Applicant: Intuit Inc., Mountain View, CA (US)

(72) Inventor: Shankar Sankararaman, Burlingame, CA (US)

(73) Assignee: Intuit Inc., Mountain View, CA (US)

( * ) Notice: Subject to any disclaimer, the term of this patent is extended or adjusted under 35 U.S.C. 154(b) by 27 days.

(21) Appl. No.: 18/647,569

(22) Filed: Apr. 26, 2024

(65) Prior Publication Data

US 2025/0335834 A1 Oct. 30, 2025

(51) Int. Cl.
*G06Q 10/04* (2023.01)
*G06N 7/01* (2023.01)
*G06Q 10/0637* (2023.01)

(52) U.S. Cl.
CPC ............... *G06Q 10/04* (2013.01); *G06N 7/01* (2023.01); *G06Q 10/0637* (2013.01)

(58) Field of Classification Search
None
See application file for complete search history.

(56) References Cited

U.S. PATENT DOCUMENTS 12,173,598 B1 * 12/2024 Tian ...................... E21B 47/022
2012/0316845 A1 * 12/2012 Grey ..................... G06F 9/5094 703/2
2013/0266201 A1 * 10/2013 Pautot ..................... G06F 18/29 382/131
2018/0253649 A1 * 9/2018 Miikkulainen .... G06Q 30/0277
2019/0294157 A1 * 9/2019 Miyagi .................... G06N 7/01
2020/0005335 A1 * 1/2020 Wang .................. G06F 16/9535
2020/0057975 A1 * 2/2020 Legrand ................... G06N 7/01
2022/0398650 A1 * 12/2022 Rosenbaum ....... G06Q 30/0633
2023/0385739 A1 * 11/2023 Bastias Largo .... G06Q 10/0635

OTHER PUBLICATIONS

Gabbi Siva, "The Bayesian Approach to A/B Testing", Jan. 2023 https://web.archive.org/web/20230128060214/https://www.dynamicyield.com/lesson/bayesian-approach-to-ab-testing/ (Year: 2023).*
Xiang et al. "Multi Armed Bandit vs AB Tests in E-Commerce" CVOR Issued, Oct. 6, 2022. DOI: 10.1145/3534678.3539144.

* cited by examiner

*Primary Examiner* — Rupangini Singh
(74) *Attorney, Agent, or Firm* — Dinsmore & Shohl LLP

(57) ABSTRACT

Certain aspects of the disclosure provide for dynamically routing traffic in A/B testing environments. In examples, a method may include receiving reward data associated with each respective variant of a set of variants corresponding to continuous values representing an outcome measure for the respective variant; generating a posterior probability density function for each respective variant in the set of variants based on the reward data for the respective variant and a prior probability density function for the respective variant; performing a sampling operation to generate an expected value of reward associated with each variant in the set of variants; assigning new traffic proportionally across each respective variant in the set of variants based on the expected value of reward associated with the respective variant; and based on the assigned new traffic, causing content associated with a variant of the set of variants to be provided to a user interface.

20 Claims, 8 Drawing Sheets

302

| VARIANT 310 | REWARD 312 |
| --- | --- |
| $V_1$ | $R_1$ |
| $V_2$ | $R_2$ |
| $V_3$ | $R_3$ |
| $V_N$ | $R_N$ |

304

| VARIANT 314 | PRIOR PARAMETER 316 |
| --- | --- |
| $V_1$ | $PRIOR_1$ |
| $V_2$ | $PRIOR_2$ |
| $V_3$ | $PRIOR_3$ |
| $V_N$ | $PRIOR_N$ |

306

| VARIANT 318 | POSTERIOR PARAMETER 320 |
| --- | --- |
| $V_1$ | $POST_1$ |
| $V_2$ | $POST_2$ |
| $V_3$ | $POST_3$ |
| $V_N$ | $POST_N$ |

308

| VARIANT 322 | ALLOCATION 324 |
| --- | --- |
| $V_1$ | $A_1$ |
| $V_2$ | $A_2$ |
| $V_3$ | $A_3$ |
| $V_N$ | $A_N$ |

*FIG. 3*

MULTI-ARM BANDIT FOR CONTINUOUS TRAFFIC ALLOCATION IN A/B TESTING HAVING CONTINUOUS REWARDS

BACKGROUND

Field

Aspects of the present disclosure relate to for allocating traffic between variants in an A/B testing environment.

Description of Related Art

A/B testing is commonly used in online environments to compare variants of a product, such as different user interface designs or content recommendations. In a typical A/B test, users are randomly assigned to variants and key metrics are measured to determine which variant performs best. Traditionally, traffic is allocated evenly across variants for the duration of the test, and analysts manually evaluate results to determine statistical significance before deciding whether to end the test or reallocate traffic.

Multi-armed bandit algorithms provide an alternative approach that automatically adjusts traffic allocation based on the measured performance of each variant, with the goal of maximizing total yield over the course of the experiment. Multi-arm bandit algorithms balance exploiting variants that appear to perform well with exploring underperforming variants that could potentially be optimal.

Many multi-arm bandit algorithms, such as epsilon-greedy and Upper Confidence Bound (UCB) algorithms, produce a discrete probability distribution over variants representing the probability of each variant being selected. Variants are typically selected by sampling from this distribution. However, challenges arise when experiment designers wish to constrain traffic allocation within user-specified ranges. That is, conventional multi-arm bandit-based approaches rely on modeling rewards as binary variables, typically following a Bernoulli distribution. However, in many real-world scenarios, the relevant metrics include continuous values rather than binary indicators. Existing platforms lack support for continuous reward distributions in multi-arm bandit-powered experiments.

SUMMARY

Certain aspects provide a method for dynamically routing traffic in A/B testing environments that implement continuous reward measures. In some examples, the method includes receiving reward data associated with each respective variant of a set of variants corresponding to continuous values representing an outcome measure for the respective variant; generating a posterior probability density function for each respective variant in the set of variants based on the reward data for the respective variant and a prior probability density function for the respective variant; performing a sampling operation to generate an expected value of reward associated with each variant in the set of variants; assigning new traffic proportionally across each respective variant in the set of variants based on the expected value of reward associated with the respective variant; and based on the assigned new traffic, causing content associated with a variant of the set of variants to be provided to a user interface. In certain aspects, the posterior probability density function for each respective variant in the set of variants refers to the posterior probability density function of the distribution parameters for the reward distribution for each respective variant in the set of variants. Similarly, in certain aspects, the prior probability density function for the respective variant refers to the prior probability density function of distribution parameters for a prior reward distribution for the respective variant.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 3 depicts example data structures representing relationships between data elements involved in the dynamic traffic allocation process for A/B testing with continuous rewards.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
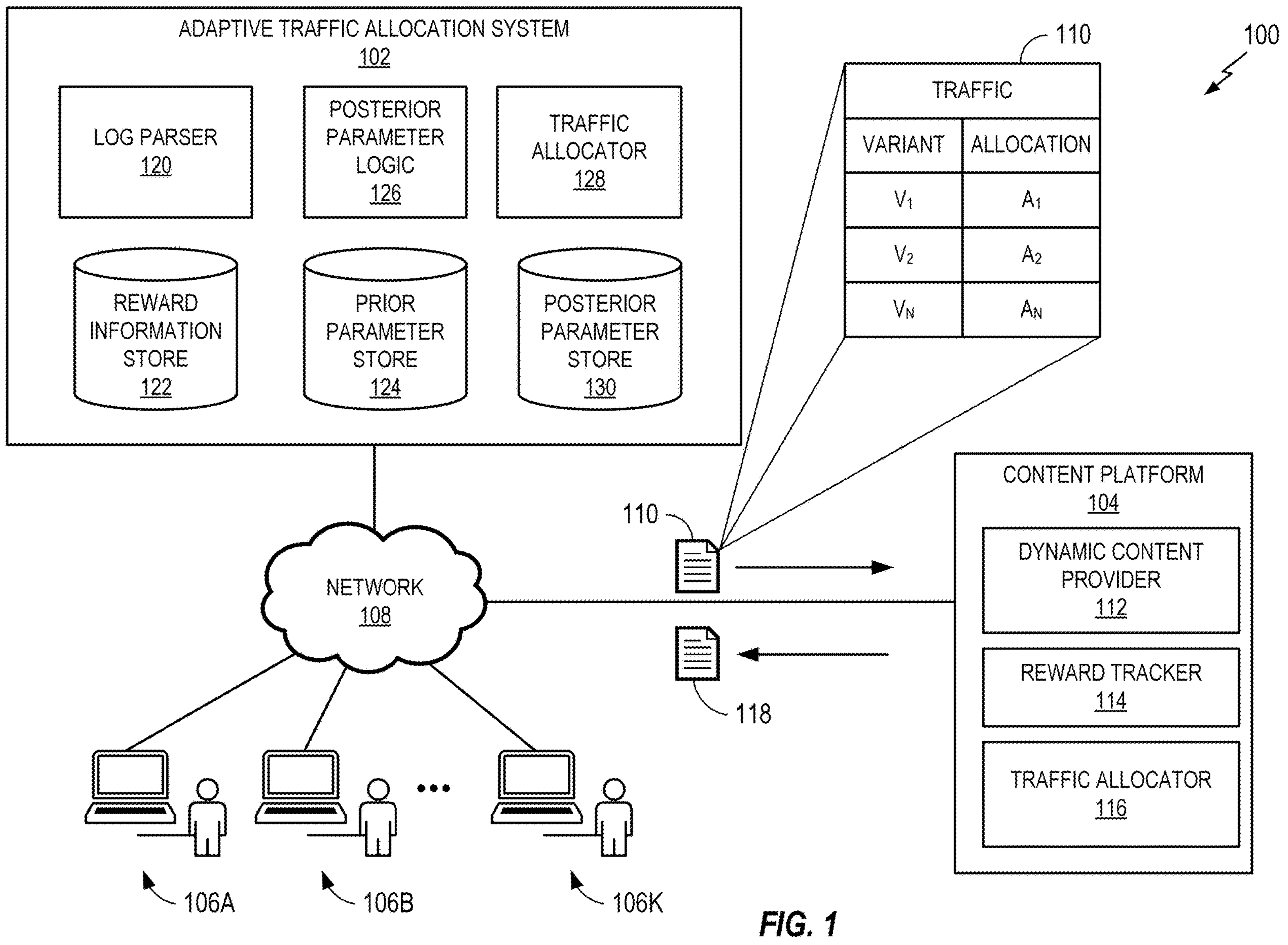
FIG. 1 depicts an exemplary system for dynamically allocating traffic between variants in an A/B testing environment having continuous rewards.

Aspects of the present disclosure provide apparatuses, methods, processing systems, and computer-readable mediums for dynamically allocating traffic between variants in an A/B testing environment with continuous rewards.

Conventional A/B testing systems, also referred to as split testing, are used to compare two or more variations (e.g., variants) of a product, feature, or marketing campaign to determine which one performs better. A/B testing is commonly used in various domains, including website optimization, app development, and digital marketing, and often rely on static traffic splitting or allocation methods optimized for binary reward metrics. A binary reward metric may refer to a discrete measure that takes on only two possible values, such as 0 or 1, true or false, yes or no, etc. A binary reward metric generally indicates whether a specific goal or objective has been achieved or not. For example, in an e-commerce context, examples of a binary reward metric could be whether a user made a purchase (1) or not (0), whether a user clicked on a displayed link (1) or not (0), or whether a user interacted with a chat bot (1) or not (0). However, many real-world scenarios involve continuous reward measures.

A continuous reward measure can take on any value within a given range, providing a more granular and nuanced measurement related to the magnitude or extent of a particular outcome. Examples of a continuous reward measure may include, but is not limited to, user engagement time (e.g., a total time spent by a user actively interacting with a website or webpage), average order value (e.g., an average monetary value of each order placed by consumers), revenue per user (e.g., an average revenue generated by each user of a product or service), and customer satisfaction score (e.g., a continuous reward measure that gauges customer satisfaction with a product, service, or specific interaction). Examples of the present disclosure describe a system for dynamically allocating traffic based on observed continuous rewards, allowing organizations to run more effective tests that are aligned with their specific goals. More specifically, aspects described herein may utilize multi-arm bandit algorithms to maximize a cumulative reward over time. Unlike traditional A/B testing, which focuses on a one-time decision based on a fixed period of data collection, multi-arm bandit algorithms adapt and learn continuously as more data becomes available.

For example, a multi-armed bandit algorithm begins with the initialization of the available actions or options, known as "arms," (e.g., variants) each having an unknown reward distribution. The algorithm sets initial estimates or beliefs about the reward distributions of each arm based on prior knowledge or default values. At each step, the multi-armed bandit algorithm selects an arm using an exploration-exploitation strategy, such as the Thompson sampling strategy, which balances the trade-off between exploiting the arm with the highest estimated reward and exploring arms based on their probabilities of producing rewards. After selecting an arm, the algorithm calculates the associated reward, which is drawn from the underlying reward distribution of the selected arm. This observed reward provides feedback about the effectiveness of the selected arm. Based on the observed reward, the algorithm updates its estimates or beliefs about the reward distribution of the selected arm, typically by adjusting the estimated mean reward and the confidence in that estimate. The specific update mechanism depends on the chosen multi-armed bandit algorithm.

The multi-armed bandit algorithm repeatedly selects an arm, observes the reward, and updates its estimates for a specified number of iterations or until a stopping criterion is met. As the algorithm progresses, it continues to assign more traffic to the arm that can obtain more rewards. Initially, the algorithm focuses more on exploration to gather information about all the arms, but as it gains more confidence in the estimated rewards, it increasingly selects the arm with the highest estimated reward.

Over time, the multi-armed bandit algorithm converges towards the optimal arm, which is the arm with the highest expected reward. The convergence speed and the regret, which is the difference between the cumulative reward of the optimal arm and the cumulative reward of the algorithm's selections, depend on the specific multi-armed bandit algorithm and the characteristics of the reward distributions. In some examples, convergence towards an optimal arm may not occur, and multiple arms can be continued to be selected by the algorithm in a probabilistic manner.

To illustrate the process, consider an online advertisement system with three ad variations (e.g., corresponding to three arms) aiming to maximize the click-through rate (reward). The multi-armed bandit algorithm initializes the estimated click-through rates for each ad variation and selects an ad variation based on its current estimates and exploration-exploitation strategy at each user visit. After displaying the selected ad, the algorithm observes whether the user clicked on it (reward of 1) or not (reward of 0) and updates the estimated click-through rate for the selected ad variation accordingly. As more user visits occur, the algorithm continually updates its estimates and adapts its ad selection strategy to maximize the overall click-through rate, ultimately learning which ad variation performs best and allocating more impressions to that variation while still occasionally exploring the other variations to adapt to potential changes in user preferences.

As previously described, existing multi-armed bandit algorithm testing techniques are often designed for discrete, binary rewards and may not optimally handle continuous reward values. Applying binary-focused methods to continuous rewards can lead to, for example, suboptimal traffic allocation and slower convergence to the best-performing variant. This can result in less effective experiments and reduced benefits from testing.

Systems and method of the present disclosure address these challenges by providing a dynamic traffic allocation system that leverages Bayesian inference and Monte Carlo sampling to implement a novel algorithm for Thompson sampling in order to learn and adapt traffic splits in real-time based on observed continuous rewards. Thompson sampling is a popular approach for solving the multi-armed bandit problem, particularly in the context of A/B testing with continuous rewards. The main idea behind Thompson sampling is to maintain a posterior distribution over the parameters of each variant's reward distribution, and to select variants based on samples drawn from these posterior distributions. This allows the algorithm to explore variants that have a high probability of being optimal, while still exploiting the currently best-performing variant.

In examples, the Thompson sampling strategy works by maintaining a belief distribution over the parameters of each variant's reward distribution. At each step, the algorithm samples a set of parameters from each variant's belief distribution and selects the variant that yields the highest expected reward under the sampled parameters. The selected variant is then implemented, and the observed reward is used to update the belief distribution for that variant, for example using Bayes' rule. This process is repeated over time, allowing the algorithm to continuously update its beliefs and adapt its variant selection strategy based on the observed rewards. In accordance with examples of the present disclosure, posterior probability distributions for each variant's reward distribution may be maintained while using expected reward estimations to make informed allocation decisions when selecting or implementing a variant. Accordingly, aspects of the system can effectively handle uncertainty that may be present in continuous reward metrics.

Systems and methods described herein address the technical problem of ineffective traffic allocation with multi-arm bandits when dealing with continuous reward data. Systems and methods described herein overcome these limitations by providing a technical solution that dynamically adjusts traffic allocation based on observed continuous rewards. By leveraging Bayesian inference and sampling techniques, the systems and methods described herein enable more efficient and effective exploration-exploitation trade-offs, leading to several technical improvements For example, aspects of the present disclosure can optimize overall performance by continuously updating the traffic allocation based on the expected value of rewards, ensuring that the best-performing variants receive the most traffic. Moreover, certain aspects may adapt to changing reward distributions over time, allowing adjustments to variations in variant performance to be made as reward distributions change to maintain optimal traffic allocations. In addition, by considering the full distribution of rewards rather than just binary outcomes, aspects described herein enable organizations to identify more impactful variants that may align with specific business objectives. Such technical improvements can result in faster convergence to an optimal variant when testing variants having continuous reward data.

In some aspects, the dynamic traffic allocation techniques described herein provide technical benefits that optimize the utilization of computing resources in A/B testing environments. For example, by continuously updating traffic allocation based on the expected value of rewards derived from continuous metrics, convergence on the optimal variant can occur more rapidly. This faster convergence reduces the computational overhead associated with prolonged A/B testing, as fewer iterations and less processing power are required to identify the preferred variant. Consequently, faster convergence enables more efficient use of CPU cycles and can be implemented using less powerful or fewer processors compared to traditional A/B testing methods.

Moreover, the faster convergence on the optimal variant allows the A/B testing process to conclude sooner, resulting in memory and storage savings over time. As the system can more quickly identify and focus on the best-performing variants, there is a reduced need to maintain data and states for underperforming variants. This leads to a smaller memory footprint and more efficient utilization of storage resources. Furthermore, by adaptively allocating a larger proportion of user requests to the best-performing variants, the invention optimizes network bandwidth usage. Less traffic is wasted on suboptimal variants, resulting in improved overall system performance, reduced network load, and a better user experience. These technical improvements ultimately enhance the scalability of A/B testing infrastructures, enabling them to handle larger volumes of continuous reward data more efficiently with advanced techniques such as inference and sampling methods.

An example practical application of the system and methods described herein is in the context of software-as-a-service (SaaS) platforms. SaaS providers can utilize the system and methods described herein to optimize user onboarding, engagement, and retention. For example, SaaS providers can conduct A/B tests on different user onboarding flows, with the continuous reward metric being the completion rate or the time spent on the platform. By dynamically allocating more traffic to the onboarding variant that leads to higher user engagement and retention, SaaS providers can improve their user experience and reduce churn, which refers to the rate at which users stop using the service or platform. Reducing churn is important for SaaS providers, as it directly impacts their revenue and grow prospects. By optimizing the user onboarding process and adapting it based on continuous reward metrics, SaaS providers can create a more engaging and retentive user experience, ultimately leading to lower churn rates and improved business outcomes.

Furthermore, the system and methods described herein can be applied in the field of content recommendation systems, such as news websites, streaming platforms, or social media networks. These platforms can run A/B tests on different content recommendation algorithms, with the continuous reward metric being the average time spent on the platform, the number of articles read, or the number of videos watched. By adaptively allocating more traffic to the recommendation variant that maximizes user engagement and satisfaction, these platforms can enhance their user experience and increase their user base.

The examples provided above demonstrate the wide range of practical scenarios in which the system and methods described herein can be applied. By leveraging the system and methods described herein, organizations across various industries can optimize their A/B testing processes, make data-driven decisions, and achieve their business objectives more effectively. The ability to adapt traffic allocation based on continuous reward metrics allows organizations to align their experimentation efforts with their specific goals, leading to improved performance, increased revenue, and enhanced user experiences.

Example System for Dynamically Allocating Traffic Between Variants

FIG. 1 illustrates an exemplary system 100 for dynamically allocating traffic between variants in an A/B testing environment having continuous rewards. The system 100 may include an adaptive traffic allocation system 102 communicatively coupled to a content platform 104 via a network 108. In certain aspects, the content platform 104 provides different variants to users and collects reward information associated with each variant. The adaptive traffic allocation system 102 can receive the reward information, generate posterior probability density functions for each variant based on the reward information and prior probability density functions, perform sampling to generate an expected value of reward for each variant, and proportionally assign new traffic to each variant based on the expected values.

In examples, the adaptive traffic allocation system 102 is configured to dynamically adjust the allocation of traffic to variants based on observed rewards using the Thompson sampling approach. The adaptive traffic allocation system 102 may include a log parser 120, a reward information store 122, a prior parameter store 124, posterior parameter logic 126, a traffic allocator 128, and a posterior parameter store 130. These components can work together to process incoming log data 118, update probability distributions using Thompson sampling, and generate new traffic allocation information 110. The Thompson sampling approach maintains a belief distribution over the parameters of each variant's reward distribution, and at each step, it samples a set of parameters from each variant's belief distribution to select the variant that yields the highest expected reward under the sampled parameters. The observed rewards are then used to update the belief distributions, allowing the system to continuously learn and adapt its traffic allocation strategy.

In certain aspects, the content platform 104 may deliver the variants to users and collecting reward data. The content platform 104 can include a dynamic content provider 112 that selects and provides the appropriate variant to each user based on a current traffic allocation information 110. The content platform 104 can also include a reward tracker 114 that measures and records the reward data associated with each variant implementation. This reward data is then transmitted to the adaptive traffic allocation system 102 as log data 118 for further processing. In certain examples, the content platform 104 and the adaptive traffic allocation system 102 can reside separate from one another as depicted in FIG. 1. Alternatively, or in addition, the content platform 104 and the adaptive traffic allocation system 102 (or one or more portions of the content platform 104 or the adaptive traffic allocation system 102) may reside within a same platform or system.

In certain examples, users 106A-K represent a plurality of users that interact with the content platform 104 over the network 108. In some aspects, the dynamic content provider 112 provides each user 106A-K with a variant and their corresponding reward data is recorded by the reward tracker 114. The number of users can vary depending on the specific application and the scale of the A/B testing experiment.

The network 108 facilitates communication between the adaptive traffic allocation system 102, the content platform 104, and the users 106A-K. The network 108 can be any type of communication network, such as the Internet, a local area network (LAN), a wide area network (WAN), or a combination thereof. The network 108 allows the content platform 104 to receive traffic allocation information from the adaptive traffic allocation system 102 and transmit reward data back to the adaptive traffic allocation system 102 for processing.

In examples, the traffic allocator 116, which is a component of the content platform 104 in this example, receives the traffic allocation information 110 from the adaptive traffic allocation system 102. In examples, the traffic allocation information 110 specifies the proportion of traffic that should be directed to each variant of the A/B test. The traffic allocator 116 can use this information to distribute incoming user traffic to the appropriate variants according to the specified allocation.

In some examples, the dynamic content provider 112 is responsible for delivering the actual variant content to the users 106A-K based on the traffic allocation determined by the traffic allocator 116. When a user requests content, the dynamic content provider 112 selects the appropriate variant to serve based on the current traffic allocation and provides the corresponding content to the user. Accordingly, each user experiences is based on the variant assigned to them by the traffic allocator 116.

In some examples, the reward tracker 114 monitors user interactions and collects reward data associated with each variant. The reward data can include various continuous reward measures such as click-through rates, conversion rates, revenue generated, or any other relevant measure of success. The reward tracker 114 can record this data for each user and variant combination, allowing for the association of rewards with specific variants. The collected reward data may then be sent to the adaptive traffic allocation system 102 for further processing and updating of the traffic allocation.

In examples, the collected reward data, along with the corresponding variant information, is transmitted from the reward tracker 114 to the adaptive traffic allocation system 102 as log data 118. The log data 118 can be transmitted periodically, such as at regular intervals or whenever a sufficient amount of new reward data has been collected. The transmitted log data 118 can include the reward values for each variant and any additional metadata that may be relevant for the adaptive traffic allocation system 102 to process and update the traffic allocation based on the observed rewards.

In some examples, the log data 118 may correspond to raw log data representing raw user interactions, raw data, or otherwise unprocessed data. In some example, the log parser 120 may receive the log data 118 and parse the log data 118 to generate continuous reward metrics. Accordingly, rather than receiving continuous metrics from the reward tracker 114, the log parser 120 may generate such metrics. As another example, the reward tracker 114 transmit log data 118 to the adaptive traffic allocation system 102 in accordance with a predetermined schedule or event. Example events that could trigger the transmission of log data 118, include but are not limited to, a fixed time interval (e.g., every hour, every day), accumulation of certain volume of log data (e.g., every 1000 user interactions), completion of a predefined number of A/B testing session, reaching a specified number of unique users participating in an A/B test, and/or detection of significant changes in user behavior or reward metrics. Alternatively, or in addition, the adaptive traffic allocation system 102 can access the log data 118 from the content platform 104 via an application programing interface (API). The log parser 120 extracts the relevant information from the log data 118, such as reward values and their corresponding variants. The log parser 120 may also perform data validation, filtering, or aggregation as necessary. The parsed data can then be stored in the reward information store 122 for further analysis and processing.

The reward information store 122, in examples, is a database or storage system that holds the processed reward data obtained from the log parser 120. The reward information store 122 organizes and stores the reward values associated with each variant, along with any relevant metadata. The reward information store 122 may provide an efficient means of accessing and retrieving the reward data for subsequent calculations and updates performed by other components of the adaptive traffic allocation system 102.

In certain aspects, the prior parameter store 124 includes prior probability density functions for each variant. These prior distributions represent the initial configurations or probability distributions for the performance of each variant before any reward data is observed. The prior distributions can be based on domain knowledge, historical data, or other relevant information. The prior parameter store 124 provides these prior distributions to the posterior parameter logic 126 for updating based on the observed reward data.

In some examples, the posterior parameter logic 126 updates the prior probability density functions stored in the prior parameter store 124 based on the observed reward data from the reward information store 122. In certain aspects, the posterior parameter logic 126 applies Bayesian inference techniques to compute the posterior probability density functions for each variant, which represents the updated probability distributions for the performance of each variant after considering the observed reward data. Bayesian inference generally relates to a method of statistical inference that updates the probability for a hypothesis as more evidence or information becomes available. In the context of the present disclosure, Bayesian inference can be used to update the probability distributions of the performance of each variant based on the observed reward data.

The posterior distributions represent the updated probability distributions for the performance of each variant after considering the observed reward data. The posterior parameter logic 126 can then use the prior distributions from the prior parameter store 124 and the reward data from the reward information store 122 to calculate the posterior distributions, which are then stored in the posterior parameter store 130. By employing Bayesian inference, the system can effectively incorporate new information from the observed reward data to refine its estimates of each variant's performance, leading to more accurate traffic allocation decisions.

The traffic allocator 128 can determine the new traffic allocation based on the posterior probability density functions stored in the posterior parameter store 130. For example, the traffic allocator 128 applies a sampling technique, such as but not limited to Monte Carlo sampling, to generate an expected value of reward for each variant. In some examples, the expected value may be calculated utilizing numerical integration techniques. The traffic allocator 128 may then assign new traffic proportionally to each variant based on their respective expected rewards. Accordingly, the variants with higher expected rewards can receive a larger share of the incoming traffic.

In examples, the posterior parameter store 130 retains the updated posterior probability density functions for each variant. These posterior distributions may be computed by the posterior parameter logic 126 based on the prior distributions from the prior parameter store 124 and the observed reward data from the reward information store 122. The posterior parameter store 130 provides the updated distributions to the traffic allocator 128 for determining the new traffic allocation.

After the traffic allocator 128 determines the new traffic allocation, the traffic allocator 128 sends this information back to the content platform 104 as traffic allocation information 110. The traffic allocation information 110 can include the updated proportions of traffic that should be assigned to each variant. The content platform 104 receives the traffic allocation information 110 and uses it to adjust the distribution of incoming traffic to the variants accordingly.

In some examples, upon receiving the updated traffic allocation information 110, the content platform 104 propagates this information to the traffic allocator 116. The traffic allocator 116 within the content platform 104 can then implement a new traffic allocation as specified by the adaptive traffic allocation system 102. More specifically, the traffic allocator 116 can update its internal rules or mechanisms to allocate or distribute incoming user traffic to the variants according to the new allocation proportions.

As previously discussed, the traffic allocator 116 works in coordination with the dynamic content provider 112 to properly implement updated traffic allocations. For example, as new users arrive and request content, the traffic allocator 116 can assign the new users to specific variants based on the updated allocation proportions. This assignment can then be communicated to the dynamic content provider 112, which serves the appropriate variant content to each user. This process continues, with the traffic allocator 116 distributing traffic and the dynamic content provider 112 delivering the corresponding variant content, until the next update is received from the adaptive traffic allocation system 102.

Example Details for Dynamically Allocating Traffic Between Variants

FIGS. 2A-2D depict additional details for dynamically allocating traffic among variants in an A/B testing environment with continuous rewards. In examples, FIGS. 2A-2D depict receiving reward data associated with each variant at a first time $T_0$, where the reward data corresponds to continuous values representing an outcome measure. Posterior probability density functions can then be generated for each variant based on the reward data and prior probability density functions. A sampling operation can then be performed to generate an expected value of reward for each variant. Accordingly, new traffic is then assigned proportionally to each variant based on their respective expected values of reward at a second time $T_1$. The implementation depicted in FIGS. 2A-2D allows for the adaptive allocation of traffic to variants based on their observed performance as indicated by continuous reward metrics, optimized over some or all outcomes of the A/B testing system.

Figure 2A:
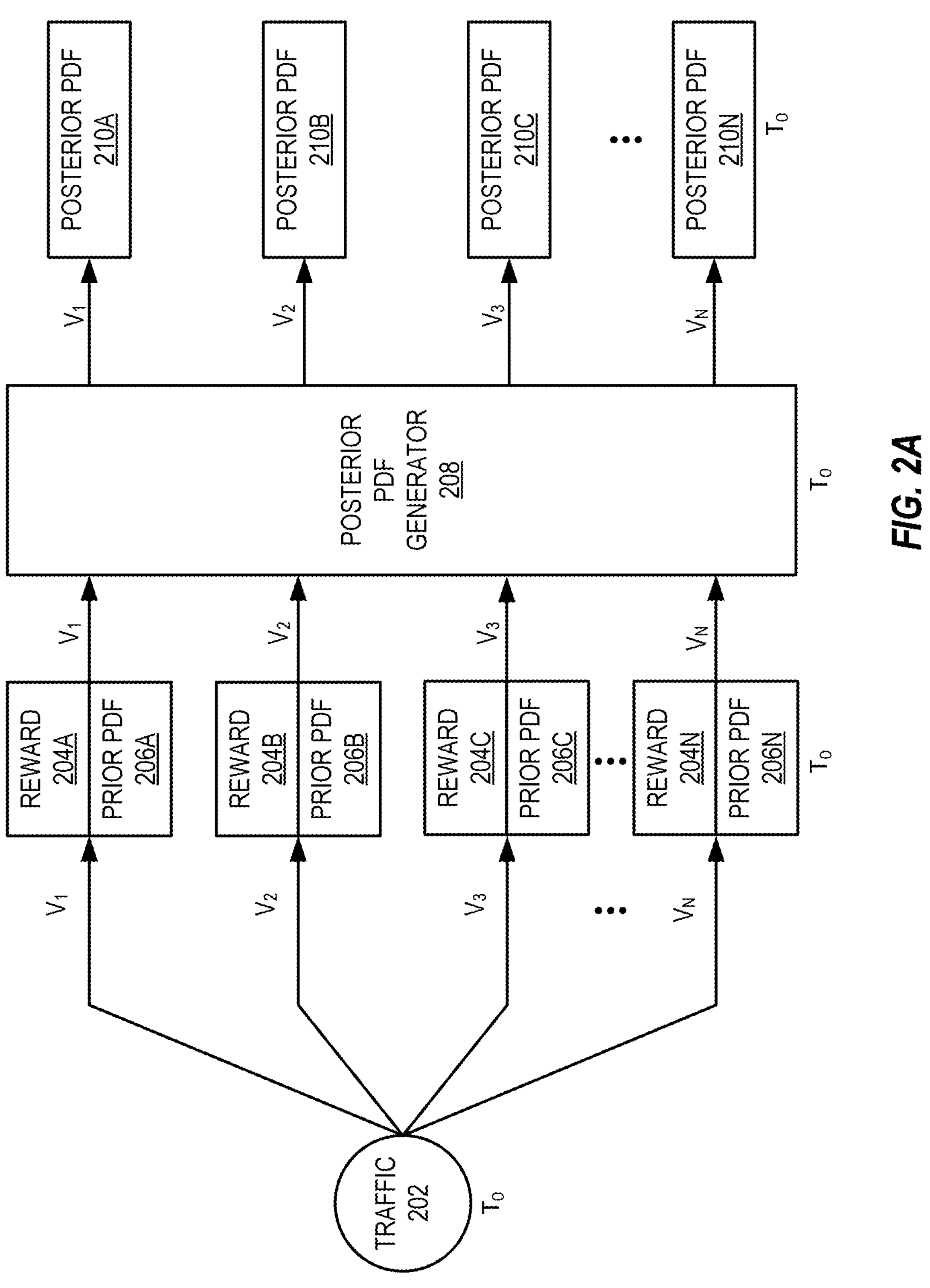
FIGS. 2A-2D depict additional details for dynamically allocating traffic among variants in an A/B testing environment with continuous rewards.

FIG. 2A depicts additional details of the exemplary process for dynamically allocating traffic among variants in an A/B testing environment with continuous rewards. In examples, incoming traffic 202 representing the users or requests that need to be allocated to different variants ($V_1$, $V_2$, $V_3$, . . . , $V_N$) for A/B testing may be received. In examples, the incoming traffic 202 is initially distributed evenly among the variants, ensuring that each variant receives an equal amount of traffic at the start of the process. As users interact with the variants, reward data 204A-204N is collected for each variant. For example, the reward data 204A corresponds to the continuous values representing the outcome measure for variant $V_1$, reward data 204B corresponds to the outcome measure for variant $V_2$, and so on, up to reward data 204N for variant $V_N$. These reward data provide a quantitative continuous measure of the performance or success of each variant ($V_1$, $V_2$, $V_3$, . . . , $V_N$).

Prior to receiving the reward data 204A-204N, each variant may be associated with a prior probability density function (PDF) 206A-206N. The prior PDFs 206A-206N represent the initial probability density function of the distribution parameters P for the reward distribution for each variant. In this context, the reward distribution follows $f(x|P)$, where x is the random variable representing the reward and P denotes the distribution parameters. The selection of a specific distribution for $f(x|P)$ can depend on the nature of the reward. For example, a normal distribution can be used when the reward can be either positive or negative (e.g., while a lognormal distribution can be used when the reward is strictly positive.

The prior PDFs of the distribution parameters P for the reward distribution for each variant are assumed to be uninformative, reflecting a lack of prior knowledge about the reward distributions. Specifically, the prior mean can be assumed to have uniform support across the entire domain, which is zero to $\infty$ when the reward is strictly positive, or $-\infty$ to $+\infty$ when the reward can be either positive or negative. The prior variance can be assumed to have support over the entire positive domain (zero to $\infty$), with a likelihood inversely proportional to the variance itself. This uninformative prior allows the posterior updates to be primarily driven by the observed reward data.

As the system dynamically allocates traffic across time-blocks (e.g., every day), the posterior distribution from one update becomes the prior distribution for the subsequent update. The likelihood function, denoted as L(P), is based on the collected list of rewards for each variant or arm and can may be proportional to the product of the reward density functions $f(x=r|P)$ for all observed rewards r in that variant, i.e., $L(P) \propto \Pi f(x=r|P)$, where the product is taken over all rewards r for the given variant.

In some examples, the prior PDFs can be based on historical data, domain knowledge, or other relevant information available before observing the actual reward data. In some examples, the PDFs 206A-206N may be equal to the same default value; alternatively, or in addition, the PDFs 206A-206N may be different.

The reward data 204A-204N and the prior PDFs 206A-206N may then be provided to the posterior PDF generator 208. The posterior PDF generator 208, which may reside at the posterior parameter logic 126 (FIG. 1) may use Bayesian inference techniques to update the prior PDFs based on the observed reward data, generating posterior PDFs 210A-210N for each variant. The posterior PDFs represent the updated probability density function of the distribution parameters for the reward distribution for each variant after considering the observed data.

The posterior PDF of P, denoted as f(P|R), is proportional to the product of the prior PDF of P, denoted as f(P), and the likelihood function L(P). This can be mathematically expressed as $f(P|R) \propto f(P)*L(P)$. Here, R is the collection of observed rewards, where each individual reward is denoted as r, and X is the random variable used to represent the reward. The proportionality sign (x) indicates that the posterior PDF is proportional to the product of the prior PDF and the likelihood function. To obtain the posterior PDF, the proportionality constant can be determined by calculating a normalizing constant (as a denominator), where the normalizing constant eliminates the proportionality and ensures that the posterior PDF is a proper probability distribution.

The posterior PDF generator 208 applies these Bayesian inference techniques to update the prior PDFs 206A-206N with the observed reward data 204A-204N, generating the posterior PDFs 210A-210N for each variant ($V_1$, $V_2$, $V_3$, . . . , $V_N$). These posterior PDFs provide an updated representation of the probability density function of the distribution parameters P for the reward distribution for each variant, taking into account both the prior knowledge and the observed data. The posterior PDFs are then used in the subsequent steps of the Thompson sampling algorithm to make informed decisions about traffic allocation.

Figure 2B:
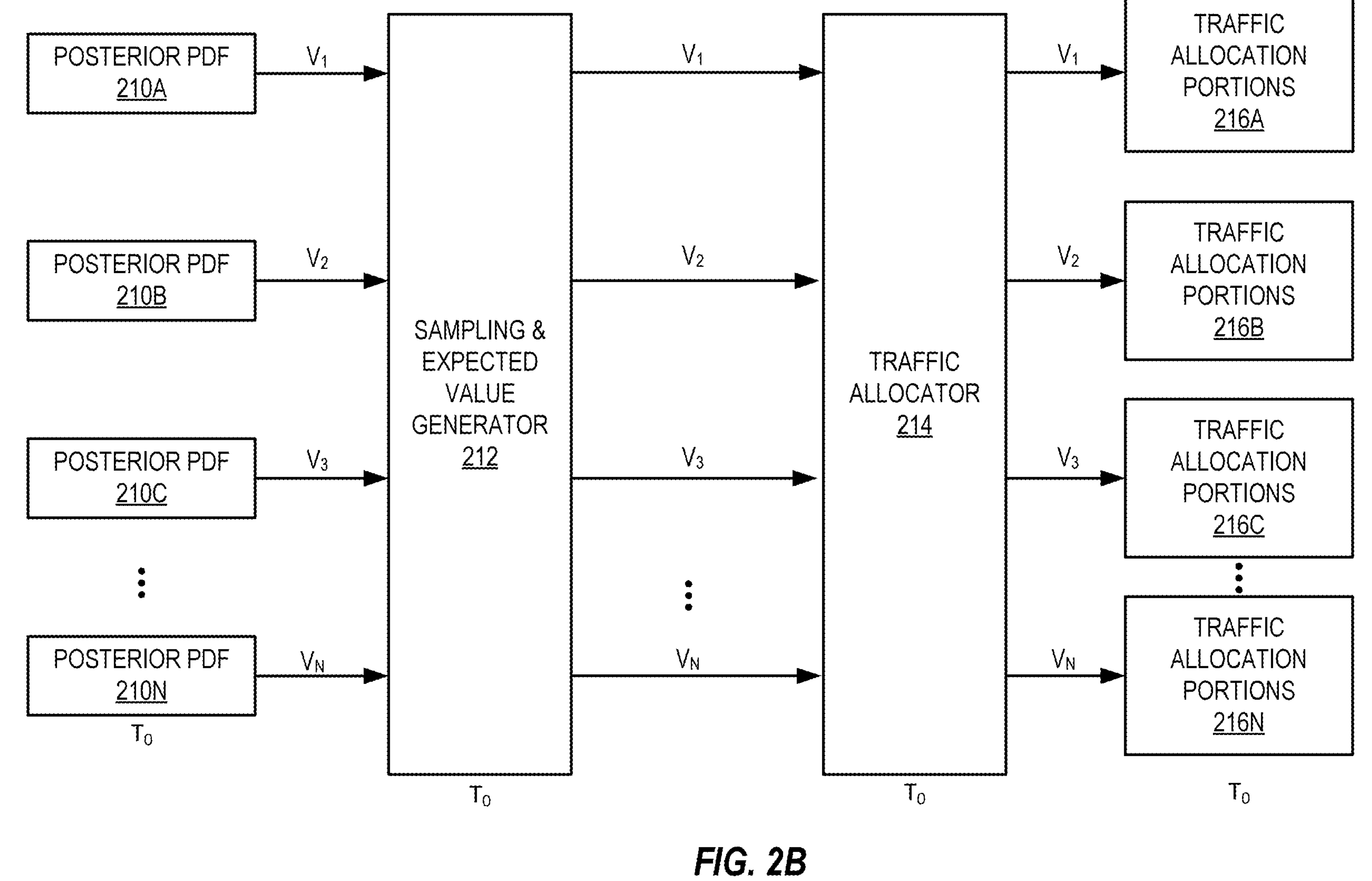

The posterior PDFs 210A-210N can then be used in the subsequent steps of the traffic allocation process, as depicted in FIG. 2B, to determine an allocation of traffic to each variant based on their expected rewards. That is, the posterior PDFs 210A-210N, generated in FIG. 2A, serve as inputs to the sampling and expected value generator 212. At the sampling and expected value generator 212, a sampling technique, such as Monte Carlo sampling, may be applied to each posterior PDF (e.g., 210A-210N) to generate a set of samples representing possible reward values for each variant (e.g., $V_1$, $V_2$, $V_3$, . . . . $V_N$). These samples are then used to calculate the expected value of reward for each variant based on their respective posterior PDFs.

The traffic allocator 214 determines the allocation of traffic to each variant and then uses the expected values of reward generated by the sampling and expected value generator 212. In some examples, the traffic allocator 214 determines the optimal allocation of traffic to each variant. In some aspects, the traffic allocator 214 assigns traffic proportionally to each variant based on their expected values of reward. Variants with higher expected rewards receive a larger share of the traffic, while variants with lower expected rewards receive a smaller share. This allows the adaptive traffic allocation system (e.g., 102 of FIG. 1) to adapt the traffic allocation dynamically based on the observed performance of each variant.

In examples, the traffic allocator 214 generates traffic allocation proportions 216A-216N for each variant ($V_1$, $V_2$, $V_3$, . . . , $V_N$). Traffic allocation portion 216A represents the proportion of traffic to be assigned to variant $V_1$, traffic allocation portion 216B represents the proportion of traffic to be assigned to variant $V_2$, and so on, up to traffic allocation portion 216N for variant $V_N$. These allocation proportions may be determined based on the expected values of reward calculated by the sampling & expected value generator 212, ensuring that variants with higher expected rewards receive a larger share of the traffic.

The traffic allocation proportions 216A-216N are then used to distribute the incoming traffic 202 (FIG. 2A) to each variant accordingly. The traffic allocator 116 (FIG. 1) within the content platform 104 (FIG. 1) may receive and implement the traffic allocation proportions to split the incoming traffic among the variants based on the specified proportions. Accordingly, the adaptive traffic allocation system (e.g., 102 of FIG. 1) can dynamically adapt the traffic allocation based on the observed performance of each variant, thereby optimizing the overall outcomes of an A/B testing process.

Figure 2C:
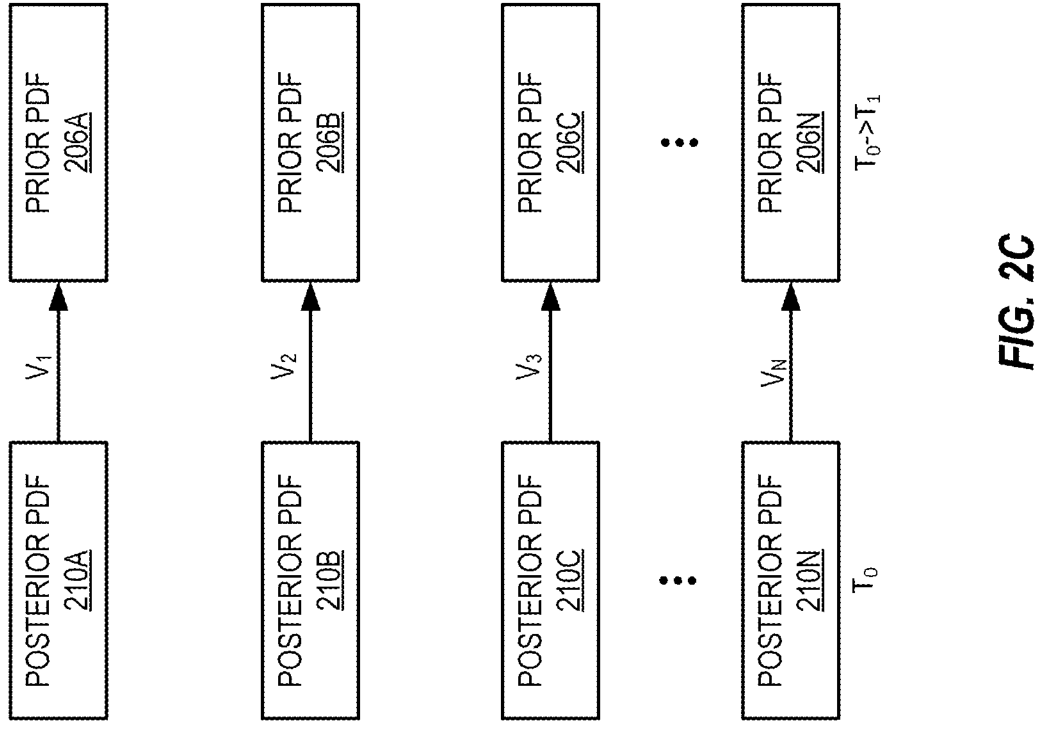

FIG. 2C the iterative updating process where the posterior PDFs from one iteration become the prior PDFs for the next iteration, allowing the adaptive traffic allocation system (e.g., 102 of FIG. 1) to incorporate the knowledge gained from the observed reward data into the prior assumptions for each variant, such as the prior probability density function of the distribution parameters for the reward distribution for the respective variant. The posterior PDFs 210A-210N, generated in the previous iteration (FIG. 2A), are used to update the prior PDFs 206A-206N for the next iteration of the traffic allocation process. This updating process is based on the principles of Bayesian inference, where the prior PDFs and the likelihood function are used to calculate the posterior PDFs. The posterior PDF of the parameters P, denoted as f(P|R), is calculated using the following formula: $f(P|R)=(f(P)*L(P))/(\text{normalizing constant})$. Here, f(P) represents the prior PDF of the parameters P, L(P) represents the likelihood function, and R represents the observed reward data. The denominator (normalizing constant) is the normalizing constant that ensures the posterior PDF integrates to 1.

In the context of the adaptive traffic allocation system, the specific distribution parameters, such as the mean and variance of the reward distribution, can be updated during each iteration. The posterior PDFs capture the updated knowledge about these parameters based on the observed reward data.

For each variant, the posterior PDF from the previous iteration is used to update the corresponding prior PDF for the next iteration. For example, the posterior PDF 210A, which represents the updated knowledge about the parameters for variant V1, is used to update the prior PDF 206A for variant V1 in the next iteration. Similarly, the posterior PDF 210B is used to update the prior PDF 206B for variant V2, and so on, up to the posterior PDF 210N updating the prior PDF 206N for variant VN.

By iteratively updating the prior PDFs with the posterior PDFs, the adaptive traffic allocation system incorporates the knowledge gained from the observed reward data into the prior assumptions for each variant. This allows the system to continuously learn and adapt its traffic allocation strategy based on the most recent information available.

Figure 2D:
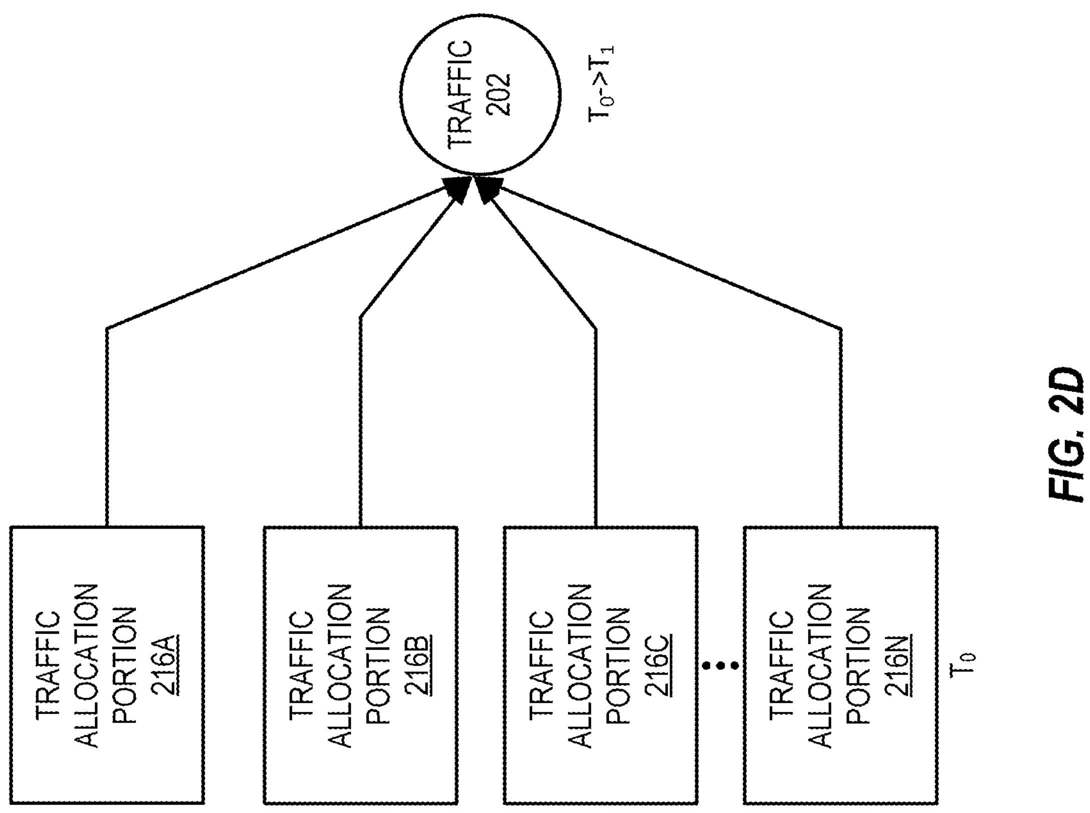

FIG. 2D illustrates the application of the updated traffic allocation proportions 216A-216N to the incoming traffic 202 for the next iteration (e.g., at a second time step $T_1$) of traffic allocation. The traffic allocation proportions 216A-216N, determined previously (FIG. 2B), specify the proportion of traffic to be allocated to each variant based on their expected rewards.

In some aspects, the traffic allocation portion 216A represents the proportion of traffic to be assigned to variant $V_1$ in the next iteration. This proportion may be determined based on the expected value of reward calculated for variant $V_1$ previously generated. Similarly, traffic allocation portion 216B represents the proportion of traffic to be assigned to variant $V_2$, and so on, up to traffic allocation portion 216N for variant $V_N$. These traffic allocation proportions can be used to ensure that variants with higher expected rewards receive a larger share of the traffic in the next iteration.

The incoming traffic 202, which represents the users or requests to be allocated to the different variants, may be distributed according to the updated traffic allocation proportions 216A-216N. The traffic allocator 116 (FIG. 1) within the content platform 104 (FIG. 1) receives the allocation proportions and ensures that the incoming traffic is split among the variants based on these proportions. For example, if traffic allocation portion 216A specifies that 30% of the traffic should be assigned to variant $V_1$, the traffic allocator will direct 30% of the incoming traffic 202 to variant $V_1$. Similarly, if traffic allocation portion 216B specifies that 20% of the traffic should be assigned to variant $V_2$, the traffic allocator will direct 20% of the incoming traffic 202 to variant $V_2$. This process is repeated for some or all of the variants, ensuring that the traffic is distributed according to the traffic allocation proportions 216A-216N.

Thus, by applying the updated traffic allocation proportions 216A-216N to the incoming traffic 202, the adaptive traffic allocation system (e.g., 102 of FIG. 1) dynamically adapts the traffic allocation based on the observed performance of each variant in the previous iteration. This allows the adaptive traffic allocation system (e.g., 102 of FIG. 1) to continuously optimize the traffic allocation, directing more traffic to variants that are performing well and less traffic to variants that are not performing as well.

In some examples, applying the traffic allocation proportions to the incoming traffic continues throughout the duration of the A/B testing process. As the adaptive traffic allocation system (e.g., 102 of FIG. 1) iterates through the steps of collecting reward data, updating the posterior PDFs, and generating new traffic allocation proportions, the incoming traffic is continuously redistributed based on the most recent allocation proportions. Accordingly, the adaptive traffic allocation system (e.g., 102 of FIG. 1) can adapt and optimize the traffic allocation in real-time (or near real-time), maximizing the overall performance and outcomes of an A/B testing system.

However, it is important to note that the A/B testing process may not always run indefinitely. There can be predefined stopping conditions or criteria that, when met, would trigger the conclusion of the A/B test. Some examples of such stopping conditions include, but are not limited to: reaching a predetermined time limit (e.g., running the A/B test for a fixed duration of 2 weeks), achieving a desired level of statistical significance in the results (e.g., concluding the test when a certain confidence level is reached), identifying a clear winner among the variants based on the observed reward data (e.g., stopping the test when one variant consistently outperforms others by a significant margin), and/or receiving manual intervention from a system administrator or stakeholder (e.g., halting the test based on external factors or business decisions).

Once a stopping condition is met, the A/B testing process can be concluded, and the system can proceed with implementing the preferred variant or taking other appropriate actions based on the test results. The adaptive traffic allocation system (e.g., 102 of FIG. 1) provides the flexibility to continuously optimize traffic allocation during the test while also accommodating the need for predefined stopping conditions.

Example Data Structures for Dynamically Allocating Traffic Between Variants

FIG. 3 depicts example data structures representing relationships between data elements involved in the dynamic traffic allocation process for A/B testing with continuous rewards. In examples, a first data structure 302 may include initial input data for dynamically allocating traffic as described with respect to FIGS. 1-2D. The first data structure 302 may include a set of variants 310 ($V_1$, $V_2$, $V_3$, . . . , $V_N$) and their corresponding reward values 312 ($R_1$, $R_2$, $R_3$, . . . , $R_N$). In examples, each variant 310 represents a specific version or configuration of the system being tested, while the reward values 312 represent the observed performance or outcome associated with each variant.

A second data structure 304 may include the same set of variants 314 ($V_1$, $V_2$, $V_3$, . . . , $V_N$) as in the first data structure 302, but now each variant is associated with a set of prior parameters 316 ($Prior_1$, $Prior_2$, $Prior_3$, . . . , $Prior_N$). The prior parameters 316 represent the initial assumptions or beliefs about the performance of each variant before observing the actual reward data. These prior parameters can be based on historical data, domain knowledge, or other relevant information. In some examples, the prior parameters 316 may represent updated assumptions or beliefs about the performance of each variant after one or more iterations.

The data in the second data structure 304 and the data in the first data structure 302 can then be processed to generate data of a third data structure 306 that includes the same set of variants 318 ($V_1$, $V_2$, $V_3$, . . . , $V_N$) as in the previous data elements, but now each variant is associated with a set of posterior parameters 320 ($Post_1$, $Post_2$, $Post_3$, . . . , $Post_N$). The posterior parameters 320 represent the updated beliefs or estimates about the performance of each variant after considering the observed reward data. In some examples, the posterior parameters are calculated using Bayesian inference techniques, which combine the prior parameters 316 with the observed reward values 312 to generate updated estimates.

A fourth data structure 308 may include the same set of variants 322 ($V_1$, $V_2$, $V_3$, . . . , $V_N$) as in the previous data elements, but now each variant is associated with a traffic allocation value 324 ($A_1$, $A_2$, $A_3$, . . . , $A_N$). The traffic allocation values 324 represent the proportion of traffic or resources that should be allocated to each variant based on their estimated performance. The allocation values can be determined by applying a sampling technique, such as Monte Carlo sampling, to the posterior parameters 320 of each variant. This sampling process generates a set of expected reward values for each variant, which are then used to calculate the traffic allocation value 324. Variants with higher expected rewards, as indicated by their posterior parameters, will receive a larger share of the traffic, while variants with lower expected rewards will receive a smaller share.

The data in the fourth data structure 308 is then used by the traffic allocator 116 (FIG. 1) of the content platform 104 (FIG. 1) to distribute the incoming traffic according to the specified allocation proportions. The traffic allocator 116 (FIG. 1) implements the traffic allocation to assign an appropriate share of traffic to a variant based on its allocation value, enabling the adaptive traffic allocation system (e.g., 102 of FIG. 1) to optimize the overall performance and outcomes of the A/B testing process.

Example Method for Dynamically Allocating Traffic Between Variants

Figure 4:
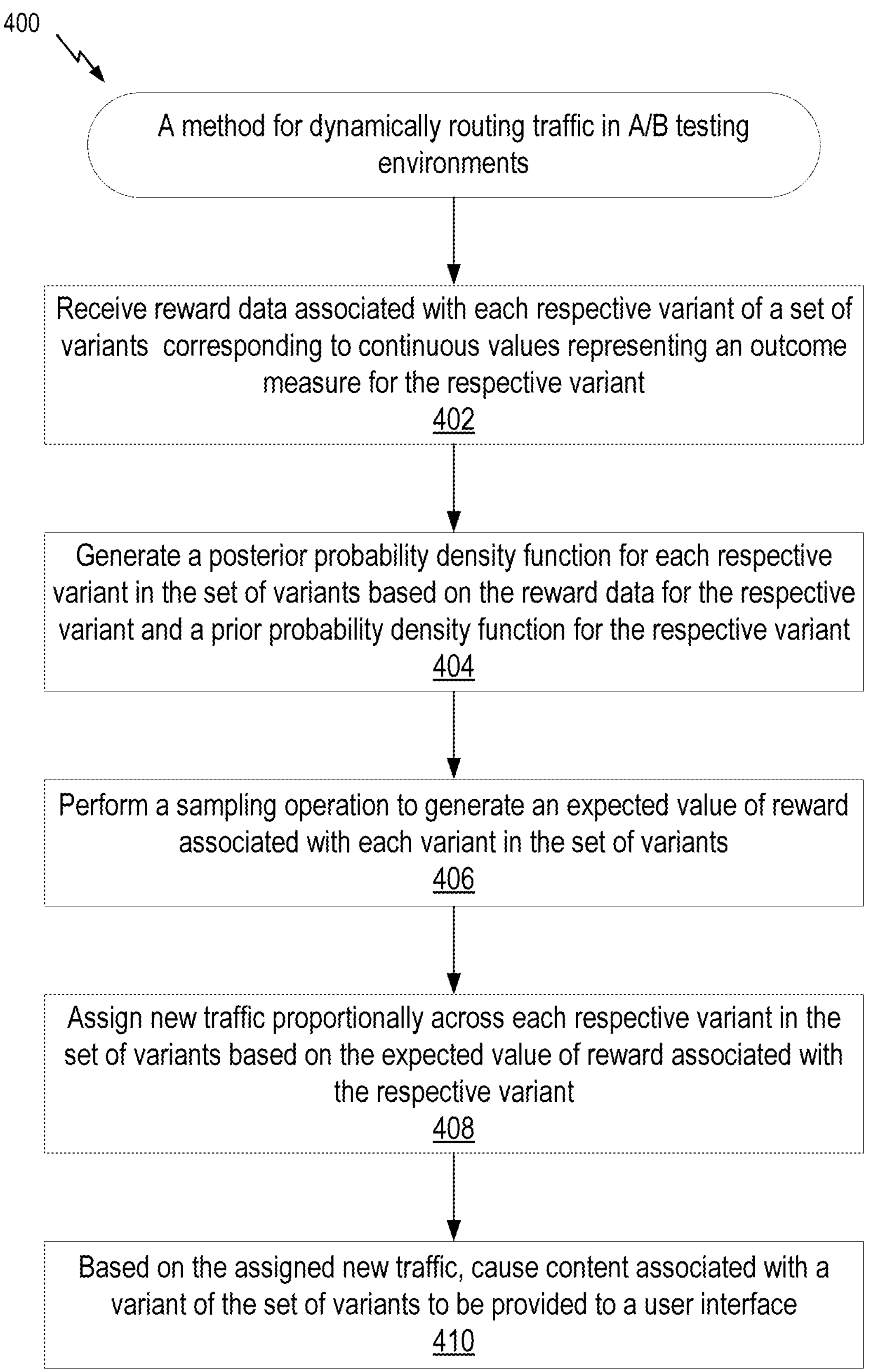
FIG. 4 depicts an example method for dynamically routing traffic in A/B testing environments that implement continuous reward measures.

FIG. 4 depicts an example method for dynamically routing traffic in A/B testing environments that implement continuous reward measures. In one aspect, method 400 can be implemented by the system 100 of FIG. 1 and/or processing system 500 of FIG. 5.

Method 400 starts at block 402 with receiving reward data associated with each respective variant of a set of variants corresponding to continuous values representing an outcome measure for the respective variant.

The method 400 continues to block 404 with generating a posterior probability density function for each respective variant in the set of variants based on the reward data for the respective variant and a prior probability density function for the respective variant. In some examples, the posterior probability density function may be generated for each respective variant in the set of variants based on the reward data for the respective variant and a prior probability density function for the respective variant following the Bayesian inference approach used in Thompson sampling. In certain aspects, the posterior probability density function for each respective variant in the set of variants refers to a posterior probability density function of the distribution parameters for the reward distribution for each respective variant in the set of variants. Similarly, in certain aspects, the prior probability density function for the respective variant refers to a prior probability density function of the distribution parameters for the prior reward distribution for the respective variant.

The method 400 continues to block 406 with performing a sampling operation to generate an expected value of reward associated with each variant in the set of variants. In some examples, a sampling operation, such as Monte Carlo sampling, is performed to generate the expected value of reward associated with each variant in the set of variants, as required by the Thompson sampling strategy.

The method 400 continues to block 408 with assigning new traffic proportionally across each respective variant in the set of variants based on the expected value of reward associated with the respective variant.

The method 400 then ends at 410, with based on the assigned new traffic, causing content associated with a variant of the set of variants to be provided to a user interface.

In some embodiments, the method 400 includes receiving log data including interactions and identifiers for users, and associating the reward data for each variant in the set of variants with respective users based on the identifiers.

In some embodiments of method 400, receiving the reward data associated with each respective variant of the set of variants further comprises receiving values indicating at least one of time spent, revenue generated, or satisfaction ratings from a user for the respective variant.

In some embodiments of method 400, performing the sampling operation further comprises repeating a sampling of the prior probability density function and the posterior probability density function for a plurality of iterations by performing Monte Carlo sampling for generating expected value of rewards for each variant in the set of variants.

In some embodiments, the method 400 includes updating a traffic allocation table to reflect the proportional distribution of new traffic assigned across each variant in the set of variants.

In some embodiments, the method 400 includes providing new traffic distributions across each variant in the set of variants by sending control signals to traffic routing devices.

In some embodiments of method 400, assigning the new traffic further comprises instructing a control interface to deliver user requests according to the expected value of reward associated with each variant in the set of variants.

In some embodiments, the method 400 includes after a subsequent time step, assigning the posterior probability density function for each variant in the set of variants as the prior probability density function. For example, a posterior probability density function of the distribution parameters for the reward distribution for a respective variant at a first time becomes the prior probability density function of the distribution parameters for the reward distribution for the respective variant at a second subsequent time.

In some embodiments of method 400, expected values are calculated using updated means of the posterior probability density function for each variant of the set of variants reflective of past reward data from users.

In some embodiments, method 400 includes logging details of distributed variants in the set of variants to specific users for maintaining associations between users and rewards.

In some embodiments of method 400, performing the sampling operation to generate the expected value of reward associated with each variant in the set of variants comprises: performing Monte Carlo sampling to determine traffic allocations after a selected time period, including: a) generating a random sample of parameters for each variant in the set of variants' probability density function; b) calculating an expected value of reward for each variant in the set of variants using a randomly sampled parameters; c) identifying which variant in the set of variants has the highest expected value of reward; d) repeating steps a) through c) for a plurality of iterations, wherein different variants are selected across the plurality of iterations; and e) determining a ratio of selections for each variant in the set of variants over the plurality of iterations, wherein the ratio establishes a traffic distribution across the variants in the set of variants.

In some embodiments of method 400, generating the posterior probability density function of the distribution parameters for the reward distribution for each variant in the set of variants comprises: obtaining posterior probability density function distributions of parameters for the reward distribution for each variant in the set of variants based on collected reward data, including: a) calculating a posterior probability density function as proportional to a prior probability density function multiplied by a likelihood function; b) establishing the prior probability density function with a prior mean and a prior variance; c) basing the likelihood function on a product of the reward density functions $f(x=r|P)$ for each observed reward assigned to a given variant in the set of variants; d) solving the posterior probability density function using at least one of numerical integration methods or sampling techniques, wherein the resulting posterior probability density function becomes the prior probability density function for subsequent rewards data; and e) generating separate posterior probability density functions of the distribution parameters for the reward distribution for each variant in the set of variants reflecting variant-specific rewards.

In some embodiments of method 400, generating the posterior probability density function of the distribution parameters for the reward distribution for each variant in the set of variants comprises obtaining posterior probability density function distributions of parameters for the reward distribution for each variant in the set of variants based on collected reward data. In examples, several steps may contribute to technical improvements and beneficial effects of the present disclosure. Non-limiting examples include calculating a posterior probability density function as proportional to a prior probability density function multiplied by a likelihood function. This step allows for the incorporation of prior knowledge or assumptions about the variant's performance (represented by the prior probability density function) and the observed reward data (represented by the likelihood function). By combining these two sources of information, examples of the present disclosure enable a more accurate and informative estimation of the variant's performance, leading to better traffic allocation decisions.

In some embodiments of method 400, generating the posterior probability density function of the distribution parameters for the reward distribution for each variant in the set of variants comprises: calculating the posterior probability density function f(P|R) as proportional to the product of the prior probability density function f(P) and the likelihood function L(P), wherein R is the collection of observed rewards, and P denotes the distribution parameters of the reward distribution in each variant; establishing the prior probability density function with an uninformative prior mean and prior variance; and determining a normalizing constant that adjusts the posterior probability density function to represent a probability distribution.

As another non-limiting example, establishing the prior probability density function with the parameters of a prior mean and a prior variance, can capture the initial beliefs or assumptions about the variant's performance before observing any reward data. By explicitly defining the prior mean and variance, examples described herein provide a flexible and customizable framework for incorporating domain knowledge or historical data into the A/B testing process. Thus, the parameters can contribute to the adaptability to different scenarios and optimized traffic allocations based on the specific characteristics of each variant and the available prior information.

As another non-limiting example, basing the likelihood function on a product of the prior probability density functions for each observed reward assigned to a given variant in the set of variants can help to ensure that the likelihood function accurately reflects the observed reward data for each variant. That is, by considering the product of the prior probability density functions, aspects described herein aggregate information from multiple observations, providing a more robust and reliable estimate of the variant's performance. Thus, the ability to handle real-world scenarios with complex and noisy reward data can lead to more accurate traffic allocation decisions.

As another non-limiting example, the posterior probability density function can be solved using numerical integration methods or sampling techniques resulting in the posterior probability density function becoming the prior probability density function for subsequent reward data. This iterative updating process allows aspects described herein to continuously learn and adapt as new reward data becomes available. By using efficient numerical methods or sampling techniques, aspects described herein can handle large-scale A/B testing scenarios with numerous variants and high-dimensional reward data. This scalability and adaptability can be important for practical applications in real-world settings, where the ability to process large amounts of data efficiently can be important for making timely and accurate traffic allocation decisions.

As another non-limiting example, generating separate posterior probability density functions of the distribution parameters for the reward distribution for each variant in the set of variants, reflecting variant-specific rewards helps to ensure that aspects described herein capture the unique performance characteristics of each variant, enabling a more granular and personalized approach to traffic allocation. By maintaining separate posterior probability density functions of the distribution parameters for the reward distribution for each variant, certain aspects can identify and exploit the best-performing variants more effectively, leading to improved overall system performance and user experience.

Thus, the combination of these steps contributes to technical improvements and beneficial effects. By accurately estimating the performance of each variant based on prior knowledge and observed reward data, aspects described herein enable more efficient and effective traffic allocation decisions. This leads to reduced computational overhead, improved resource utilization, and faster convergence to the optimal variant. Furthermore, the ability to handle complex and noisy reward data, adapt to different scenarios, and scale to large-scale A/B testing environments makes aspects described herein a valuable tool for optimizing online systems and improving user engagement.

Note that FIG. 4 is just one example of a method, and other methods including fewer, additional, or alternative steps are possible consistent with this disclosure.

Figure 5:
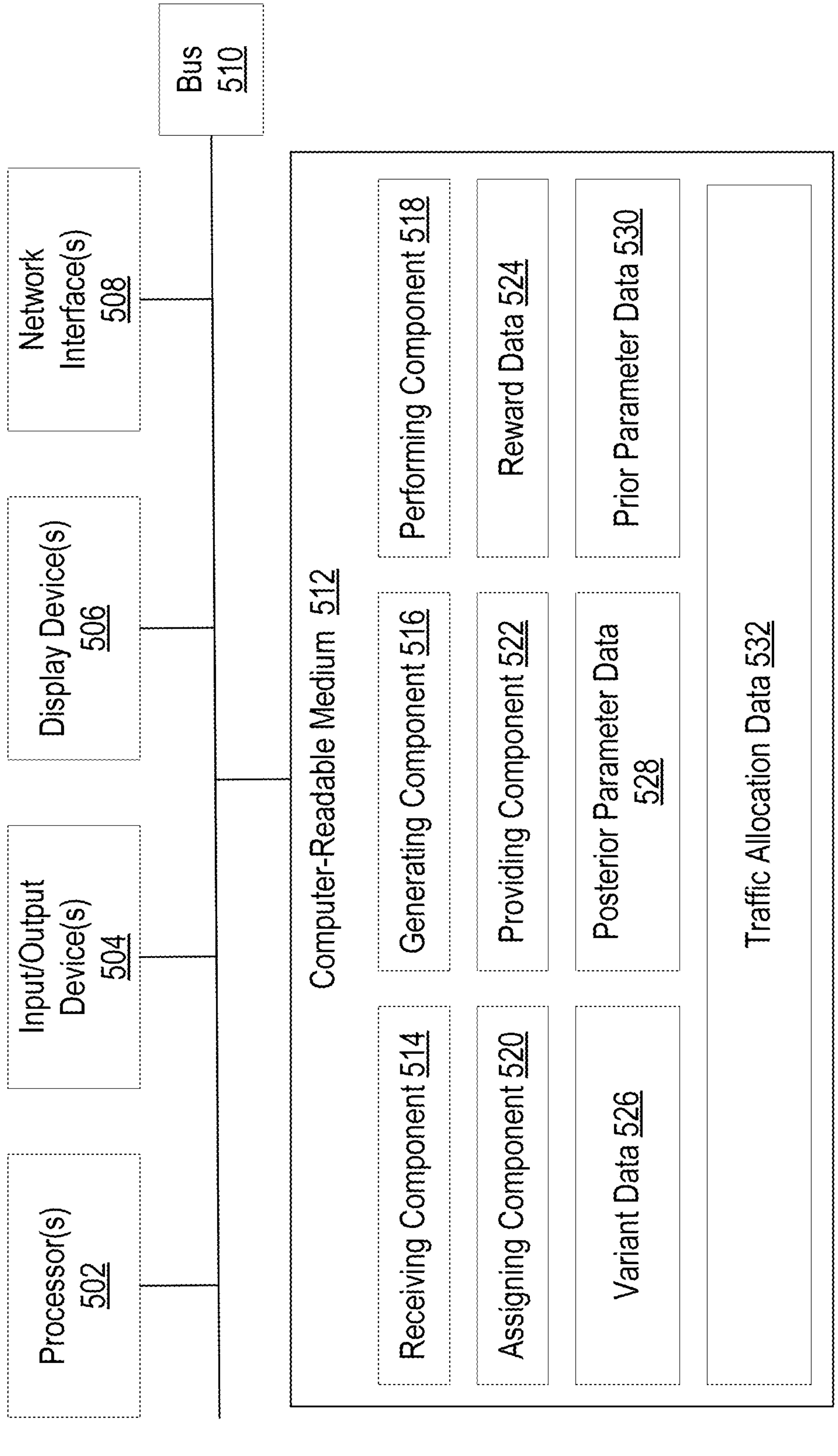
FIG. 5 depicts an example processing system with which aspects of the present disclosure can be performed.

Example Processing System for Dynamically Allocating Traffic Between Variants FIG. 5 depicts an example processing system 500 configured to perform various aspects described herein, including, for example, method 400 as described above with respect to FIG. 4.

Processing system 500 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain embodiments, processor(s) 502 are representative of a one or more central processing units (CPUs), graphics processing unit (GPUs), tensor processing unit (TPUs), accelerators, and other processing devices.

Input/output device(s) 504 may include any device, mechanism, system, interactive display, and/or various other hardware and software components for communicating information between processing system 500 and a user of processing system 500. For example, input/output device(s)

504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 506 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes a receiving component 514, a generating component 516, a performing component 518, an assignment component 520, a providing component 522, reward data 524, variant data 526, posterior parameter data 528, prior parameter data 530, and traffic allocation data 532.

In certain embodiments, component 514 is configured to receive reward data associated with each respective variant of a set of variants corresponding to continuous values representing an outcome measure for the respective variant. For example, as depicted in FIG. 1, reward data may be provided by the reward tracker 114 (FIG. 1). In some examples, the reward data may be stored as reward data 524. In some examples, information for a variant, and/or a set of variants, may be stored as variant data 526.

In certain embodiments, component 516 is configured to generate a posterior probability density function of the distribution parameters for the reward distribution for each respective variant in the set of variants based on the reward data for the respective variant and a prior probability density function of the distribution parameters for the reward distribution for the respective variant, for example in a manner similar to or the same as the post parameter logic 125 (FIG. 1) and/or the posterior PDF generator 208 (FIG. 2A). In some examples, the posterior probability density function of the distribution parameters for the reward distribution for each respective variant may be stored as posterior parameter data 528. In some examples, the prior probability density function of the distribution parameters for the reward distribution for each respective variant may be stored as prior parameter data 530.

In certain embodiments, component 518 is configured to perform a sampling operation to generate an expected value of reward associated with each variant in the set of variants, for example in a manner similar to or the same as the sampling & expected value generator 212 (FIG. 2B).

In certain embodiments, assignment component 520 is configured to assign new traffic proportionally across each respective variant in the set of variants based on the expected value of reward associated with the respective variant, for example in a manner similar to or the same as the traffic allocator 128/116 (FIG. 1) and/or the traffic allocator 214 (FIG. 2B). In some examples, traffic assignment data may be stored as traffic allocation data 532 and/or traffic allocation information 110 (FIG. 1).

In certain embodiments, component 522 is configured to cause content associated with a variant of the set of variants to be provided to a user interface based on the assigned new traffic, for example in a manner similar to or the same as the content platform 104 (FIG. 1) and/or the dynamic content provider 112 (FIG. 1).

Note that FIG. 5 is just one example of a processing system consistent with aspects described herein, and other processing systems having additional, alternative, or fewer components are possible consistent with this disclosure.

Example Clauses

Implementation examples are described in the following numbered clauses:

Clause 1: A method for dynamically routing traffic in A/B testing environments that implement continuous reward measures, the method comprising: receiving reward data associated with each respective variant of a set of variants corresponding to continuous values representing an outcome measure for the respective variant; generating a posterior probability density function of the distribution parameters for the reward distribution for each respective variant in the set of variants based on the reward data for the respective variant and a prior probability density function of the distribution parameters for the reward distribution for the respective variant; performing a sampling operation to generate an expected value of reward associated with each variant in the set of variants; assigning new traffic proportionally across each respective variant in the set of variants based on the expected value of reward associated with the respective variant; and based on the assigned new traffic, causing content associated with a variant of the set of variants to be provided to a user interface.

Clause 2: The method of Clause 1, further comprising receiving log data including interactions and identifiers for users, and associating the reward data for each variant in the set of variants with respective users based on the identifiers.

Clause 3: The method of Clause 2, wherein receiving the reward data associated with each respective variant of the set of variants further comprises receiving values indicating at least one of time spent, revenue generated, or satisfaction ratings from a user for the respective variant.

Clause 4: The method of any one of Clauses 1-3, wherein performing the sampling operation further comprises repeating a sampling of the prior probability density function and the posterior probability density function for a plurality of iterations by performing Monte Carlo sampling for generating expected value of rewards for each variant in the set of variants.

Clause 5: The method of any one of Clauses 1-4, further comprising updating a traffic allocation table to reflect the proportional distribution of new traffic assigned across each variant in the set of variants.

Clause 6: The method of any one of Clauses 1-5, further comprising providing new traffic distributions across each variant in the set of variants by sending control signals to traffic routing devices.

Clause 7: The method of any one of Clauses 1-6, wherein assigning the new traffic further comprises instructing a control interface to deliver user requests according to the expected value of reward associated with each variant in the set of variants.

Clause 8: The method of any one of Clauses 1-7, further comprising, after a subsequent time step, assigning the posterior probability density function for each variant in the set of variants as the prior probability density function.

Clause 9: The method of any one of Clauses 1-8, wherein expected values are calculated using updated means of the posterior probability density function of the distribution parameters for the reward distribution for each variant of the set of variants reflective of recent past reward data from users.

Clause 10: The method of any one of Clauses 1-9, further comprising logging details of distributed variants in the set of variants to specific users for maintaining associations between users and rewards.

Clause 11: The method of any one of Clauses 1-10, wherein performing the sampling operation to generate the expected value of reward associated with each variant in the set of variants comprises: performing Monte Carlo sampling to determine traffic allocations after a selected time period, including: a) generating a random sample of parameters for the reward distribution for each variant in the set of variants' probability density function; b) calculating an expected value of reward for each variant in the set of variants using a randomly sampled parameters; c) identifying which variant in the set of variants has the highest expected value of reward; d) repeating steps a) through c) for a plurality of iterations, wherein different variants are selected across the plurality of iterations; and e) determining a ratio of selections for each variant in the set of variants over the plurality of iterations, wherein the ratio establishes a traffic distribution across the variants in the set of variants.

Clause 12: The method of any one of Clauses 1-11, generating the posterior probability density function of the distribution parameters for the reward distribution for each variant in the set of variants comprises: obtaining posterior probability density function distributions of parameters for the reward distribution for each variant in the set of variants based on collected reward data, including: a) calculating a posterior probability density function as proportional to a prior probability density function multiplied by a likelihood function; b) establishing the prior probability density function with a prior mean and a prior variance; c) basing the likelihood function on a product of the reward density functions $f(x=r|P)$ for each observed reward assigned to a given variant in the set of variants; d) solving the posterior probability density function using at least one of numerical integration methods or sampling techniques, wherein the resulting posterior probability density function becomes the prior probability density function for subsequent rewards data; and e) generating separate posterior probability density functions for each variant in the set of variants reflecting variant-specific rewards.

Clause 13: The method of any one of Clauses 1-12, wherein generating the posterior probability density function of the distribution parameters for the reward distribution for each variant in the set of variants comprises: calculating the posterior probability density function $f(P|R)$ as proportional to the product of the prior probability density function $f(P)$ and the likelihood function $L(P)$, wherein R is the collection of observed rewards, and P denotes the distribution parameters of the reward distribution in each variant; establishing the prior probability density function with an uninformative prior mean and prior variance; and determining a normalizing constant that adjusts the posterior probability density function to represent a probability distribution.

Clause 14: A processing system, comprising: a memory comprising computer-executable instructions; and a processor configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium storing program code for causing a processing system to perform the steps of any one of Clauses 1-13.

Clause 17: A computer program product embodied on a computer-readable storage medium comprising code for performing a method in accordance with any one of Clauses 1-13.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamically routing traffic in A/B testing environments that implement continuous reward measures, the method comprising:

sending, via one or more traffic routing devices, the traffic to each respective variant of a set of variants according to a respective initial traffic allocation for each respective variant of the set of variants;

iteratively performing, until a stopping criterion is met, the steps of:

receiving reward data associated with each respective variant of the set of variants corresponding to continuous values representing an outcome measure for the respective variant;

generating a posterior probability density function for each respective variant in the set of variants based on the reward data for the respective variant and a prior probability density function for the respective variant;

performing a sampling operation on the posterior probability density function for each respective variant to generate an expected value of reward associated with each respective variant in the set of variants;

assigning a new traffic allocation to each respective variant in the set of variants based on the expected value of reward associated with the respective variant;

sending control signals to the one or more traffic routing devices to implement the new traffic allocation to each respective variant in the set of variants; and sending, via the one or more traffic routing devices, the traffic to each respective variant in the set of variants according to the assigned new traffic allocation, wherein the stopping criterion includes at least one of:

a predetermined time limit;

a specified number of iterations of the steps; or identifying a variant of the set of variants having the respective expected value of reward higher than the respective expected value of reward for remaining variants of the set of variants for a set number of iterations of the steps;

based on meeting the stopping criterion, identifying an optimal variant from the set of variants having a highest expected value of reward among the set of variants; and sending control signals, to the one or more traffic routing devices, to route incoming traffic according to the identified optimal variant.

2. The method of claim 1, further comprising:

receiving log data including interactions and identifiers for users; and associating the reward data for each variant in the set of variants with respective users based on the identifiers.

3. The method of claim 2, wherein receiving the reward data associated with each respective variant of the set of variants further comprises receiving values indicating at least one of time spent, revenue generated, or satisfaction ratings from a user for the respective variant.

4. The method of claim 1, wherein performing the sampling operation further comprises repeating a sampling of the prior probability density function and the posterior probability density function for a plurality of iterations by performing Monte Carlo sampling for generating the expected value of reward for each variant in the set of variants.

5. The method of claim 1, further comprising updating a traffic allocation table to reflect a proportional distribution of the traffic assigned across each variant in the set of variants.

6. The method of claim 1, wherein assigning the new traffic allocation further comprises instructing a control interface to deliver user requests according to the expected value of reward associated with each variant in the set of variants.

7. The method of claim 1, further comprising, after a subsequent time step, assigning the posterior probability density function for each variant in the set of variants as the prior probability density function.

8. The method of claim 1, wherein the expected value of reward associated with each respective variant is calculated using updated means of the posterior probability density function for each variant of the set of variants reflective of past reward data from users.

9. The method of claim 1, further comprising logging details of distributed variants in the set of variants to specific users for maintaining associations between users and rewards.

10. The method of claim 1, wherein performing the sampling operation to generate the expected value of reward associated with each variant in the set of variants comprises:

performing Monte Carlo sampling to determine traffic allocations after a selected time period, including:

a) generating a random sample of parameters using the posterior probability density function for each variant in the set of variants;

b) calculating the expected value of reward for each variant in the set of variants using the random sample of parameters;

c) identifying which variant in the set of variants has a highest expected value of reward;

d) repeating steps a) through c) for a plurality of iterations, wherein different variants are selected across the plurality of iterations; and e) determining a ratio of selections for each variant in the set of variants over the plurality of iterations, wherein the ratio establishes a traffic distribution across the variants in the set of variants.

11. The method of claim 1, wherein generating the posterior probability density function for each variant in the set of variants comprises:

obtaining posterior probability density function distributions of parameters for each variant in the set of variants based on collected reward data, including:

a) calculating the posterior probability density function as proportional to the prior probability density function multiplied by a likelihood function;

b) establishing the prior probability density function with a prior mean and a prior variance;

c) basing the likelihood function on a product of a reward density function for each observed reward assigned to a given variant in the set of variants;

d) solving the posterior probability density function using at least one of numerical integration methods or sampling techniques, wherein a resulting posterior probability density function becomes the prior probability density function for subsequent reward data; and e) generating separate posterior probability density functions for each variant in the set of variants reflecting variant-specific rewards.

12. The method of claim 1, wherein generating the posterior probability density function for each variant in the set of variants comprises:

calculating a posterior probability density function $f(P|R)$ as proportional to a product of a prior probability density function $f(P)$ and a likelihood function $L(P)$, wherein $R$ is a collection of observed rewards, and $P$ denotes distribution parameters of a reward distribution in each variant;

establishing the prior probability density function with an uninformative prior mean and prior variance; and determining a normalizing constant that adjusts the posterior probability density function to represent a probability distribution.

13. A processing system, comprising:

a memory comprising computer-executable instructions; and a processor configured to execute the computer-executable instructions and cause the processing system to:

send, via one or more traffic routing devices, traffic to each respective variant of a set of variants according to a respective initial traffic allocation for each respective variant of the set of variants;

iteratively perform, until a stopping criterion is met, the steps of:

receiving reward data associated with each respective variant of the set of variants corresponding to continuous values representing an outcome measure for the respective variant;

generating a posterior probability density function for each respective variant in the set of variants based on the reward data for the respective variant and a prior probability density function for the respective variant;

performing a sampling operation on the posterior probability density function for each respective variant to generate an expected value of reward associated with each respective variant in the set of variants;

assigning a new traffic allocation to each respective variant in the set of variants based on the expected value of reward associated with the respective variant;

sending control signals to the one or more traffic routing devices to implement the new traffic allocation to each respective variant in the set of variants; and sending, via the one or more traffic routing devices, the traffic to each respective variant in the set of variants according to the assigned new traffic allocation; wherein the stopping criterion includes at least one of:

a predetermined time limit;

a specified number of iterations of the steps; or identifying a variant of the set of variants having the respective expected value of reward higher than the respective expected value of reward for remaining variants of the set of variants for a set number of iterations of the steps;

determine that the stopping criterion is met;

identify an optimal variant from the set of variants having a highest expected value of reward among the set of variants; and send control signals, to the one or more traffic routing devices, to route incoming traffic according to the identified optimal variant.

14. The processing system of claim 13, wherein the processor is configured to execute the computer-executable instructions and cause the processing system to:

receive log data including interactions and identifiers for users; and associate the reward data for each variant in the set of variants with respective users based on the identifiers.

15. The processing system of claim 14, wherein to receive the reward data associated with each respective variant of the set of variants, the processor is configured to execute the computer-executable instructions and cause the processing system to receive values indicating at least one of time spent, revenue generated, or satisfaction ratings from a user for the respective variant.

16. The processing system of claim 13, wherein to perform the sampling operation, the processor is configured to execute the computer-executable instructions and cause the processing system to repeat a sampling of the prior probability density function and the posterior probability density function for a plurality of iterations by performing Monte Carlo sampling for generating the expected value of reward for each variant in the set of variants.

17. The processing system of claim 13, wherein the processor is configured to execute the computer-executable instructions and cause the processing system to update a traffic allocation table to reflect a proportional distribution of the traffic assigned across each variant in the set of variants.

18. The processing system of claim 13, wherein to assign the new traffic allocation, the processor is configured to execute the computer-executable instructions and cause the processing system to instruct a control interface to deliver user requests according to the expected value of reward associated with each variant in the set of variants.

19. The processing system of claim 13, wherein the processor is configured to execute the computer-executable instructions and cause the processing system to, after a subsequent time step, assign the posterior probability density function for each variant in the set of variants as the prior probability density function.

20. The processing system of claim 13, wherein the processor is configured to execute the computer-executable instructions and cause the processing system to calculate the expected value of reward associated with each respective variant using updated means of the posterior probability density function for each variant of the set of variants reflective of past reward data from users.

* * * * *